United States Patent

[11] 3,591,860

[72] Inventors Henry T. Sampson
 807 Center St., El Segundo, Calif. 90245;
 George H. Miley, 1913 Galen Court,
 Champaign, Ill. 61820
[21] Appl. No. 746,525
[22] Filed July 22, 1968
[45] Patented July 6, 1971

[54] GAMMA-ELECTRIC CELL
 9 Claims, 6 Drawing Figs.
[52] U.S. Cl. .................................................. 310/3,
 136/202
[51] Int. Cl. ...................................................... G21d 7/00
[50] Field of Search ............................................ 310/3, 3 D,
 3 C; 136/202

[56] References Cited
 OTHER REFERENCES
 Gross et al., "Currents From Gammas Make Detectors And Batteries," NUCLEONICS, March 1961, pp. 86, 88, 89.

Primary Examiner—Richard A. Farley
Assistant Examiner—Brian L. Ribando
Attorney—Smyth, Roston and Pavitt ABSTRACT: The present invention relates to a gamma-electric cell for producing a high-output voltage from a source of radiation wherein the gamma-electric cell includes a central collector constructed of a dense metal and with the central collector encapsulated within an outer layer of dielectric material. A further conductive layer is then disposed on or within the dielectric material so as to provide for a high voltage output between the conductive layer and the central collector upon the reception of radiation by the gamma-electric cell. The invention also includes the use of a plurality of collectors radiating from the central collector throughout the dielectric material so as to increase the collection area and thereby increase the current and/or output voltage. Other aspects of the invention are directed to the method of producing a high voltage output gamma-electric cell by encapsulation techniques using a dielectric material which is castable and curable so as to provide for an intimate contact between the collectors and the dielectric material which surrounds and encapsulates the collectors. Other aspects of the method of encapsulation of the present invention include the use of specific dielectric materials and also the elimination of trapped gases within the dielectric material.

INVENTORS.
Henry T. Sampson
George H. Miley

ATTORNEYS

INVENTORS:
Henry T. Sampson
George H. Miley

ATTORNEYS

INVENTORS:
Henry T. Sampson
George H. Miley

ATTORNEYS

GAMMA-ELECTRIC CELL

The present invention is directed to a gamma-electric cell and to a method of manufacturing and a method of using the gamma-electric cell so as to produce a high voltage output when the gamma-electric cell is subjected to radiation. For example, the gamma-electric cell of the present invention may be subjected to radiation from a nuclear reactor and the output of the gamma-electric cell may be used as a measurement of the radiation of the nuclear reactor. Also, since the voltage output of the gamma-electric cell is relatively high compared with prior art cells, the cell itself may be used as a subsidiary source of power so as to increase the overall efficiency of the nuclear reactor system.

One particular embodiment of the invention uses the principles of the present invention so as to provide for the shield for the nuclear reactor wherein the shield itself converts the radiation and specifically the gamma rays in the radiation so as to produce a high output voltage signal which, as indicated above, may be a subsidiary source of power.

In order to produce a high voltage output from the gamma-electric cell, the present invention includes improvements in the physical construction of the cell plus improvements in the method of constructing the cell. The general construction of a gamma-electric cell in accordance with the teachings of the present invention includes a central collector composed of a dense metal such as lead or tungsten. Surrounding and encapsulating the central collector is a dielectric material which operates to produce a scattering of electrons in accordance with the reception of radiation such as gamma rays. This scattering of electrons is in accordance with the known principle of "Compton scattering."

In general, the gamma rays which enter the dielectric material produce a scattering of electrons in the dielectric material. There is a forward movement of the electrons through the dielectric material until at least a portion of the electrons reach a collector electrode, which electrons induce a potential in the collector. The dielectric material may include a conductive layer and the output voltage is taken between the collector electrode and the conductive layer. The dielectric layer serves a dual function in that it acts both as a source of electrons and also electrically insulates the collector from the conductive layer. The structure described above is generally referred to in this application as a gamma-electric cell, since it converts gamma rays to electric energy.

Theoretically, the output voltage of the gamma-electric cell of the present invention is unlimited. However, in the physical model, the output voltage is limited by the dielectric strength and the electrical conductivity of the dielectric material. In addition, the output voltage is in accordance with the intensity of the gamma rays. Prior art cells are further limited in their output voltage because of the particular physical construction of these prior art cells. For example, the construction of the prior art cells allows for the presence of surface charges which tend to reduce the output voltage. In addition, the construction of the prior art cells provides for leakage paths which further reduce the output voltage. The present invention eliminates such surface charges and leakage paths so as to provide for a high voltage output gamma-electric cell.

The gamma-electric cell of the present invention offers a unique power source for high-voltage, low-current applications. Also, the gamma-electric cell is relatively simple and rugged and is inexpensive to manufacture. One particular use for the gamma-electric cell would be as an integral part of the shielding of a nuclear reactor. The gamma-electric cell would, therefore, recover a portion of the gamma energy normally dissipated in the shield. Therefore, in addition to the electrical energy generated through the conventional heat-generator cycle of the nuclear reactor, an auxiliary supply of high-voltage power would be available from the gamma-electric cell without requiring added equipment or high-voltage transformers. In other cases, it may be desirable to use a step down transformer to obtain low voltage DC or AC power for conventional uses.

The specific uses of a nuclear reactor incorporating the gamma-electric cell may be for situations where combined reactor and charge particle accelerator operation is desired, or for ionic space propulsion units. Other uses may be the provision of a long-life rugged means of coupling remote location reactor or radioisotope generators to specialized high-voltage circuits such as are used for pumping lasers.

Since the output of the gamma-electric cell is dependent upon the intensity of the gamma energy, the gamma-electric cell of the present invention may also be used as a radiation detector by measuring current or voltage buildup. Some of the advantages of the use of a gamma-electric cell as a radiation detector are that the gamma-electric cell is self-powered and does not require an auxiliary power supply. Also, the gamma-electric cell of the present invention has a linear voltage buildup response over a large range extending to very intense flux fields.

There have been prior art efforts to construct cells for producing an electrical output in accordance with a gamma ray input. Specifically, cells have been built which use the scattering of Compton electrons in a dielectric, which scattering of electrons is produced by the reception of gamma rays. As an example, reference is made to Pat. No. 3,122,640 to Gross issued Feb. 25, 1964, which patent discloses an electric cell which produces an electrical output in accordance with the reception of gamma rays.

However, the prior art cells such as are shown in the Gross patent do not provide for a high-voltage output and indeed these prior art cells are not concerned with a voltage output but rather are concerned with a current output. This may be seen in the Gross patent wherein Gross indicates that he directly measures the flow of electrons in the insulator. Additional problems with the use of a device such as shown in the Gross patent are that leakage paths are developed which leakage paths tend to dissipate the buildup of the voltage. Also, in a cell of the type shown in the Gross patent a surface charge may be created at the interface between the dielectric material and the collector.

Applicant's device eliminates the problems encountered in the prior art gamma-electric cells in that applicant provides for an encapsulation of the metal collector by the dielectric material. Applicant's dielectric material, therefore, must be castable so as to provide for the encapsulation and curable so as to form the solid encapsulation of the metal collector. Prior art structures such as shown by the Gross patent do not teach the use of encapsulation as is present in applicant's invention. For example, in the Gross patent it is disclosed that the outer scatterer may be constructed of material such as Lucite, Plexiglas, Mylar, quartz or special glass, which materials are not castable and curable and, although Gross does disclose the use of polystyrene, there is no indication in the Gross patent that the polystyrene is used in any different manner than the other materials.

Other advantages of applicant's invention lie in the specific construction wherein additional collectors extend from the central collector into the dielectric material so as to increase the collection area between the dielectric material and the central collector and thereby provide for an increased voltage output.

Other aspects of applicant's invention lie in the particular techniques used to encapsulate the gamma-electric cell and specifically lie in the construction of the gamma-electric cell by pouring a castable dielectric material about the central collector and then allowing the dielectric material to stand for a period of time sufficient so that all of the entrapped gas escapes and then finally raising the temperature of the dielectric material above room temperature for a period of time sufficient to completely cure the dielectric material. All of these above-described operations, as will be disclosed, are accomplished over extended periods of time so that the dielectric material does not rapidly shrink, thereby causing cracking which may in turn result in the production of leakage paths for the electrical current.

Also, the encapsulation technique of the present invention provides for intimate contact between the dielectric material and the collectors so that no surface charge is developed between the interface of the dielectric material and the collectors. The elimination of the surface charge and the elimination of leakage paths as discussed above provide for an extremely high voltage output from the gamma-electric cell of the present invention.

A clearer understanding of the present invention will be had with reference to the following description and drawings wherein.

Figure 1:
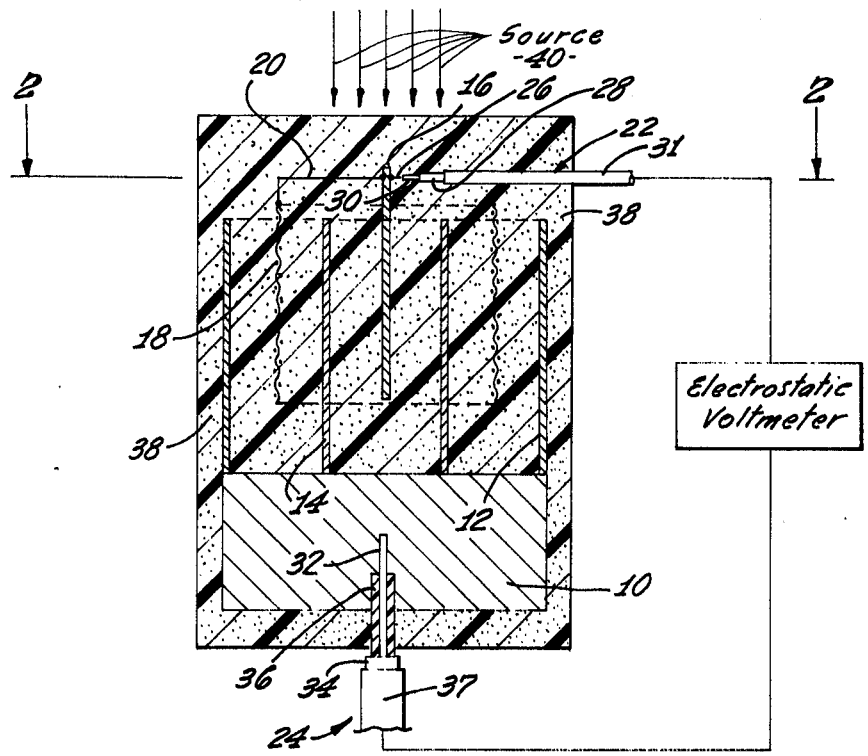
FIG. 1 illustrates a cross-sectional view of a first embodiment of the invention using multiple collectors located perpendicular to the principal collector.
Figure 2:
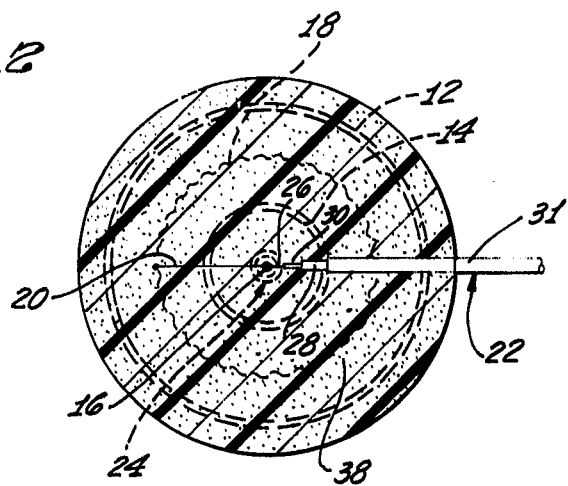
FIG. 2 is a top cross-sectional view of the embodiment of FIG. 1 taken along the lines 2-2 of FIG. 1.

In the embodiment of the gamma-electric cell of FIGS. 1 and 2, a principal collector 10 may be constructed from a dense metal such as lead or tungsten. It is to be appreciated that lead and tungsten are illustrative only and that other materials may be used. Extending from the principal collector 10 are a plurality of parallel cylindrical collectors and, specifically as shown in FIG. 1, a pair of cylindrical collectors 12 and 14 are shown extending from the principal collector 10. The cylindrical collectors 12 and 14 may be constructed of a metal such as aluminum. Specifically, for both the principal collector 10 and the multiple collectors 12 and 14, it is desirable that the material which is used be inert in the presence of radiation. It is desirable, therefore, that the materials used for the collectors do not become excessively radioactive or deteriorate in the presence of radiation.

A ground electrode for the embodiment of FIG. 1 is formed from a first rod member 16 which extends within the cylindrical collector 14. In addition, the ground electrode includes a grid 18 which is also formed as a cylinder and which grid extends between the cylindrical collectors 12 and 14. As an example, the rod member 16 may be composed of aluminum and the grid 18 may be constructed of a copper mesh or copper wire formed into a cylinder. The rod 16 and the grid 18 are electrically connected by a wire member 20.

A pair of electrical output cables 22 and 24 are connected respectively to the ground electrode 16 and the principal collector 10. Specifically, the cable 22 includes an inner conductor 26, an outer conductive shield 28 separated by an insulating member 30, and an outer dielectric layer 31, while cable 24 includes an inner conductor 32, an outer shield 34 separated by an insulating material 36, and an outer dielectric layer 37. The output signal developed by the gamma-electric cell of FIGS. 1 and 2 is taken across the cables 24 and 22 wherein the cable 24 serves as a signal or high-voltage cable and wherein the cable 22 serves as a ground cable. Both cables may be of the type commonly referred to as coaxial cables. The output of the cell of FIGS. 1 and 2 may be measured using a voltmeter such as an electrostatic voltmeter.

The structure disclosed above is encapsulated using a castable, curable dielectric material 38. As can be seen in FIG. 1, dielectric material 38 forms a one-piece dielectric member which substantially encloses all of the various structural elements described above and, in addition, serves as a source of scattered Compton electrons. Specifically, assuming a source of radiation, such as gamma rays shown by the arrows 40, is directed toward the gamma-electric cell of FIG. 1. The gamma rays 40 enter the dielectric material 38 and the gamma rays produce a scattering of electrons in the dielectric material. There is a net forward movement of Compton electrons and a portion of the Compton electrons reach the collector electrodes 12 and 14 and the principal collector 10 to induce a potential in them. This potential may be measured with reference to the ground electrode formed by the members 16 and 18. The dielectric material 38 not only serves as a source of the electrons but also serves to insulate the collectors from the ground electrode.

Theoretically, the output voltage of a gamma-electric cell, such as shown in FIGS. 1 and 2, is unlimited. However, in a practical device the output voltage is limited by the dielectric strength and the electrical conductivity of the dielectric material 38. Both of these properties are dependent upon the composition and molecular structure of the dielectric material. Other factors which contribute to the limitation of the output voltage of a gamma-electric cell as shown in FIGS. 1 and 2 is the structure of the interface between the dielectric material and the collectors and also the presence of any leakage paths in or across the surface of the dielectric material.

It is, therefore, desirable to provide for a dielectric material which has a high dielectric strength and a low electrical conductivity. In addition, it is desirable that the dielectric material be provided around the collectors so as to have an intimate contact with the collectors and also any leakage paths in or across the surface of the dielectric material should be minimized or eliminated. Generally, in the present invention, dielectric materials have been chosen from the group of materials composed of epoxies, silicones and polystyrenes. However, a general discussion of specific materials and some examples of particular methods of encapsulation will be explained in greater detail in a later portion of this specification.

Figure 3:
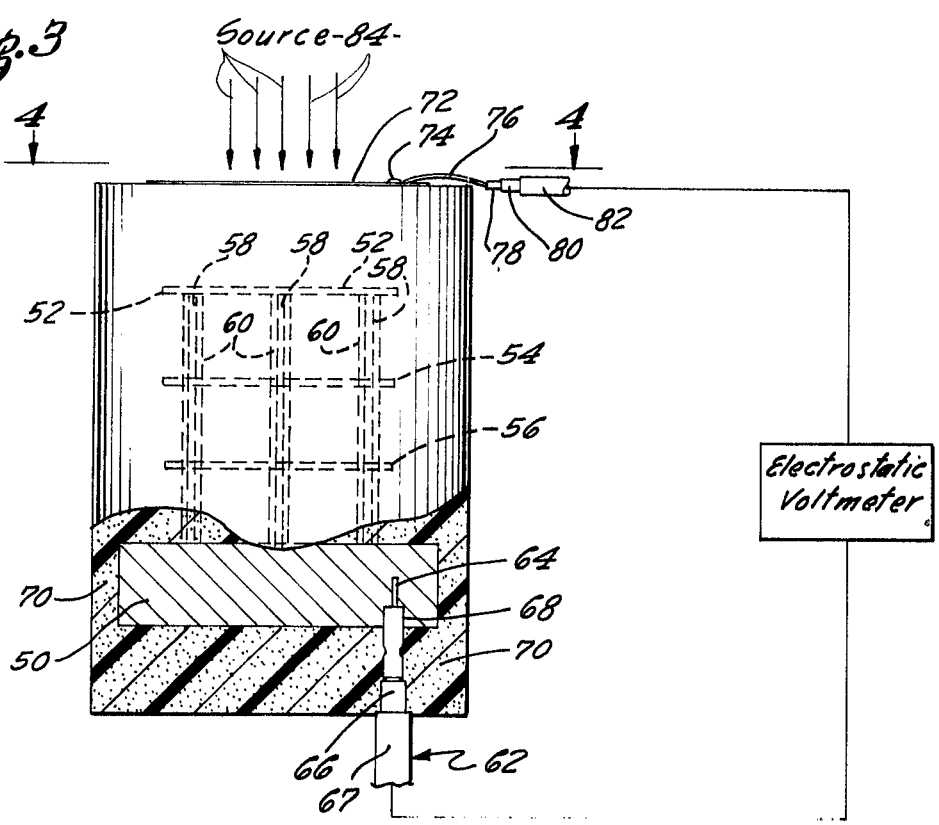
FIG. 3 is a cross-sectional view of a second embodiment of the invention using multiple collectors located parallel to the principal collector.
Figure 4:
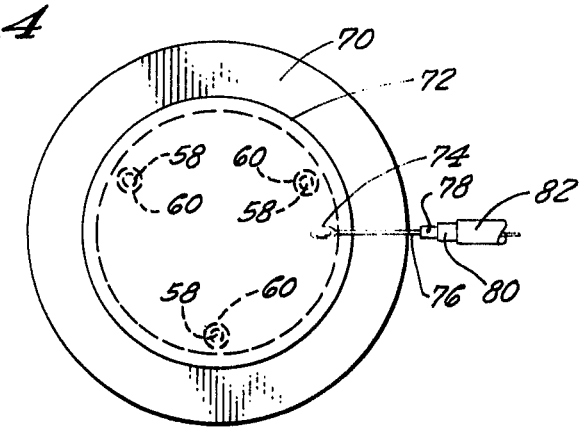
FIG. 4 is a top view of the embodiment of FIG. 3.

A second example of a gamma-electric cell constructed in accordance with the teachings of the present invention is shown in FIGS. 3 and 4 and includes a principal collector 50 and a pluraLity of collectors radiating from the principal collector. Specifically, a plurality of plate members 52, 54 and 56 serve as auxiliary collector members. The collectors 52, 54 and 56 are interconnected to the principal collector 50 using conductive support members 58 which support members are covered by a dielectric material 60. The principal collector 50 may be constructed of a dense metal such as lead, whereas the spaced collector members 52, 54 and 56 may be constructed of a conductive material such as aluminum. As indicated above, the particular materials indicated are illustrative only and other appropriate materials may be used. An output signal cable 62 includes an inner conductor member 64, and outer shield member 66, an insulator 68 separating the conductor 64 and shield 66, and an outer layer of dielectric material 67 which serves as a protective layer.

The structure described above is encapsulated with a castable-curable dielectric material 70. As indicated above, this dielectric material may be chosen from a group of materials specifically including epoxy, silicone and polystyrene. A ground electrode 72 may be formed on the dielectric material 70 using a thin conductive layer such as a conductive paint. A ground cable is connected to the ground electrode 72 at position 74 and the ground cable includes an inner conductor 76, an outer conductor 78, and two layers of dielectric material 80 and 82.

The source of radiation impinging on the gamma-electric cell of FIGS. 3 and 4 is designated by the arrows 84 and as this radiation enters the dielectric material 70, the radiation causes a scattering of Compton electrons.

The Compton electrons are received by the collectors 52, 54 and 56 and the principal collector 50 to produce a potential in the central collector 50. This potential may be measured between the signal cable 62 and the ground cable 76. In order to provide for a high output voltage from the gamma-electric cell of FIGS. 3 and 4, it is desirable that an intimate contact be maintained between the dielectric material and the collectors and that no leakage paths be present in the dielectric material. The dielectric material 70, therefore, is encapsulated around the remaining structure in a manner to be described at a later portion of this specification.

Figure 5:
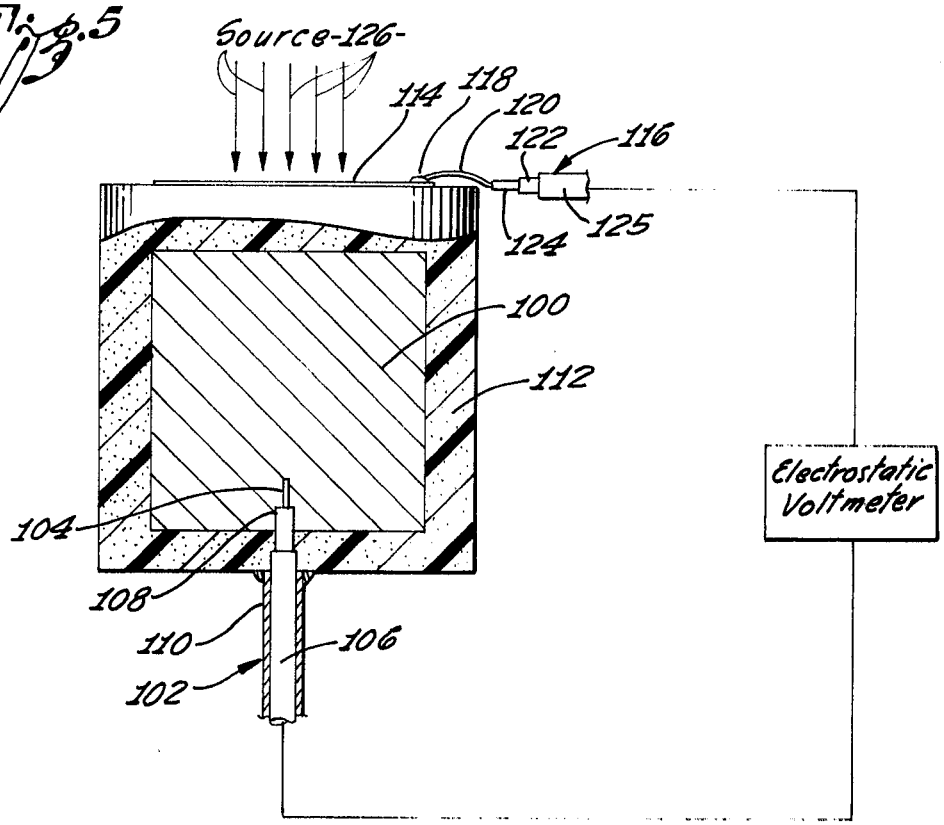
FIG. 5 is a cross-sectional view of a third embodiment of the invention.

A third example of a gamma-electric cell constructed in accordance with teachings of the present invention is shown in FIG. 5. In the embodiment of FIG. 5, the gamma-electric cell includes a collector electrode 100 constructed of a dense metal such as lead. A signal cable 102 is connected to the collector electrode 100 to receive an output signal from the collector electrode. Signal cable 102 includes an inner conductor 104, an outer shield 106, and, in addition, includes an insulating layer 108 between the inner conductor 104 and the outer shield 106. The signal cable 102 may also include an outer layer of insulating material 110 to protect the shield 104.

The collector electrode 100 and a portion of the signal cable 102 are encapsulated by a castable, curable dielectric material 112. A ground electrode may be provided by a conductive layer 114 such as a conductive paint and a ground cable 116 is connected to the ground electrode at position 118. The ground cable 116 includes an inner conductor 120, an outer shield 122, which conductor 120 and shield 122 are separated by an insulating material 124, and an outer protective layer of dielectric material 125. The source of radiation for the embodiment of FIG. 5 is shown by arrows 126 and when the radiation enters the dielectric material 112, the radiation produces a scattering of Compton electrons in the dielectric material. The scattered electrons are collected by the collector electrode 100 to produce a potential in the collector electrode. The potential in the collector electrode 100 may be measured between the signal cable 102 and the ground cable 116. The dielectric material 112 is encapsulated so as to assure an intimate contact at the interface between the dielectric material 112 and the collector electrode 100 and also to eliminate any leakage paths in the dielectric material.

It is to be appreciated that in the examples illustrated in FIGS. 1 through 5 the source of radiation has been shown extending in a particular direction. However, it is to be noted that the gamma-electric cells shown in FIGS. 1 to 5 will operate with radiation coming from other directions since the scattering of Compton electrons occurs in the dielectric material with radiation coming from other directions.

Figure 6:
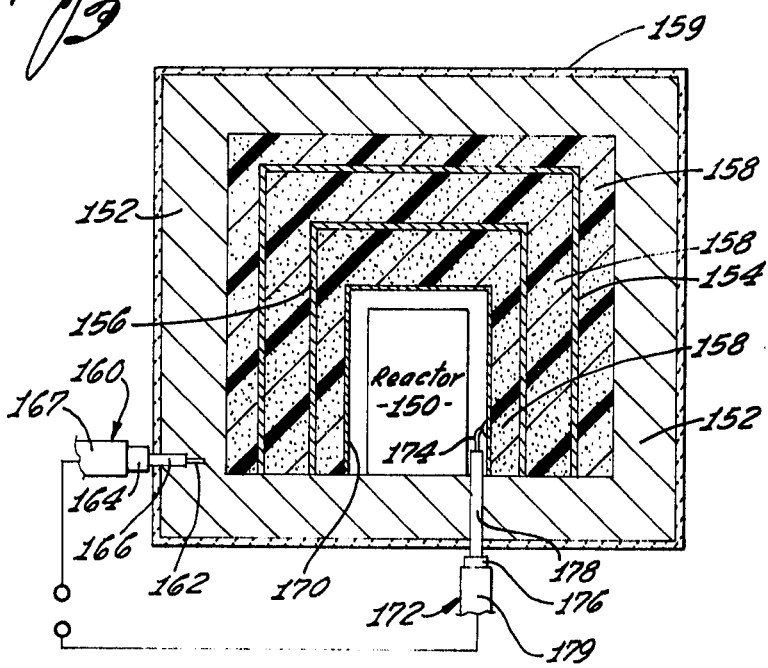
FIG. 6 illustrates an embodiment of the gamma-electric cell of the present invention used as an integral shield for a nuclear reactor.

FIG. 6 illustrates a specific use of the gamma-electric cell of the present invention so as shield, provide for a shielding shield a nuclear reactor such as nuclear reactor 150 and, in addition, providing for an auxiliary source of power from the nuclear reactor. The structure of FIG. 6, therefore, recovers a portion of the energy from the nuclear reactor, which energy is usually lost by radiation.

In the structure of FIG. 6, the nuclear reactor 150 is fully enclosed by a shield, such as a lead shield 152. The shield 152 also supports a plurality of conductors radiating internally within the shield 152. Specifically, conductors 154 and 156 extend from the lead shield 152 and these conductor members form auxiliary collectors. The lead shield 152, therefore, forms the principal collector and the members 154 and 156 radiate from this principal collector. Interspersed between the collectors 152, 154 and 156 is dielectric material 158, which dielectric material is castable and curable. The dielectric material may, therefore, be poured between the collectors 154 and 156 and the lead shield 152 to thereby provide for an encapsulation so as to ensure an intimate contact between the dielectric material and the collector and shield.

An appropriate signal cable 160 may be provided, which cable has an inner conductor 162, an outer shield 164, both separated by an insulator 166, and an outer layer of dielectric material 167. A ground conductor 170 is provided and a ground cable 172 is connected to the ground conductor. The ground cable includes an inner conductor 174, an outer shield 176, both separated by an insulator 178, and also includes an outer protective layer of dielectric material 179. The output may be taken between the cables 160 and 172. It is to be appreciated that the ground conductor 170 may include additional members which are interspersed between the collectors 152, 154 and 156 in a manner similar to that shown in the embodiment of FIGS. 1 and 2.

During the operation of the reactor 150, substantial radiation is produced by the reactor, which radiation enters the dielectric material 158, thereby providing for a scattering of Compton electrons in the dielectric material. The scattered electrons are collected by the collectors 152, 154 and 156, thereby providing for a potential in these collectors. This potential has a substantially high voltage so as to recover a portion of energy from the reactor which would ordinarily be wasted.

In order to provide for a high output voltage from the gamma-electric cells of the present invention, it is important to properly choose the dielectric materials and to construct the gamma-electric cells to eliminate surface charges and leakage paths. For example, the dielectric materials used in the gamma-electric cell of the present invention are generally known as organic polymers. These organic polymers may be divided into two groups according to their overall physical and chemical response to a radiation environment.

A first group of polymer materials is cross-linked by radiation, thereby leading to a higher molecular weight, in improvement in most physical properties and an increased thermal stability. For example, this first group of polymers includes such dielectric materials as epoxies, polystyrenes, silicones, polyethylenes, polypropylenes and polyurethanes. A second group of polymer materials is degraded by radiation and form lower molecular weight products by chain scission during radiation. Some of the polymers which fall into this second group are Lucite, Teflon cellulose and polyisobutylene. Since the gamma-electric cell of the present invention is subjected to radiation, one of the first groups of polymers would normally be chosen as the dielectric material.

Although any of the first group of organic polymers mentioned above which are cross-linked by radiation could be usable for the dielectric material, the specific polymers which were found to yield the best results when used as the dielectric material of the present invention were polystyrene, epoxy and silicone. The specific reasons for the selection of the above materials are that these polymers have a tendency to strongly cross-link under the influence of radiation and therefore maintain their physical integrity during long exposures to the radiation environment. Also, these polymers contain aromatic groups, which aromatic groups are well known to be more stable when subjected to radiation. In addition to the above, the electrical resistivity of the specifically chosen polymers is normally very high and, although reduced when exposed to radiation, these polymers still maintain a high resistivity. Specifically, each of the polymers selected has a normal resistivity exceeding $10^{15}$ ohm-centimeter. Also, each of the materials chosen has a high dielectric strength as required for high voltage operation. Also, because of the necessity to form the gamma-electric cells using encapsulation procedures, each of the materials was chosen since it is compatible with the encapsulation procedures which are to be described.

The particular encapsulation procedures are in accordance with the specific polymer material used. It is to be noted, however, that products manufactured by various companies may be used in the encapsulation procedures and the invention is not limited to specific materials. However, in general, after the dielectric material in a castable form is poured into a mold enclosing the other portions of the gamma-electric cell, the material is allowed to set for a significant length of time so as to allow all entrapped gases to escape. Also, all of the encapsulation procedures to be described include curing the dielectric material at an elevated temperature, again for an appreciable length of time.

A specific procedure used for a silicon dielectric material is as follows: The portions of the gamma-electric cell to be encapsulated are placed in a mold. A silicone potting resin, such as a potting resin designated as Sylgard 182, which is manufactured by Dow Corning, is mixed with the curing agent which is supplied by Dow Corning. The silicone resin is poured directly into the mold which contains the parts to be encapsulated. The potting resin is then allowed to stand for a sufficient waiting period so that all of the entrapped bubbles escape. This prevents cracking upon a later curing of the dielectric material. The assembly is then placed in an over which has been raised to approximately 60° C. and maintained at this temperature for a relatively long period of time, for example, 24 hours. The assembly is then removed and allowed to cool to room temperature. This provides for an encapsulation using silicone as the dielectric material which does not have any leakage paths and which has an intimate contact between the dielectric material and the collectors.

A second material which may be used is an epoxy. It was found during the use of the epoxy that the encapsulations had exhibited a tendency to crack on cooling down from the curing temperature. This cracking is probably and hot to the fact that the polymerization is highly exothermic and hot spots could easily develop in the interior of the casting. These hot spots may in turn cause thermal stresses with an ultimate cracking due to differences in the contraction rates between the resin and the encapsulated metal parts upon the cooling.

The cracking of the epoxy resin was solved by adding polystyrene beads to the epoxy resin. There is no chemical reaction between the polystyrene beads and the epoxy and the beads serve as an inert filler material. The beads also absorb some of the heat of polymerization during curing and, therefore, reduce shrinkage on curing. This technique of mixing the polystyrene beads and the epoxy resins produces homogeneous crack-free encapsulations. The particular chemical structure of the epoxy varies with its formulation and extent of polymerization. However, an epoxy resin prepolymer may be obtained from the Shell Chemical Company and has a trade name of Epon 828. This material is generally obtained by means of a condensation polymerization of epichlorohydrin and bisphenol-A. A curing agent is used with the epoxy and, as an example, Shell Chemical Company provides a curing agent which they designate as Epon curing agent D, which is to be used with their Epon 828. The curing agent is a liquid tertiary amine salt.

The method of using the materials is as follows: The epoxy is mixed with the polystyrene beads and the mixture is preheated in a 70° C. oven for about 20 minutes. The curing agent is then added and the resin is again heated in the 70° C. oven for about 10 minutes. Any entrapped air is then removed from the mixture before the resin is carefully poured into the mold containing the components to be encapsulated. The casting is then allowed to gel at room temperature, which requires several days. After gelation, the casting is post-cured in a 60° C. oven for approximately 30 hours and the oven is then turned off and the casting allowed to cool slowly to room temperature. The slow cooling prevents any thermal stress cracking in the casting. This above procedure provides for a gamma-electric cell having an intimate contact between the dielectric material and the collectors and, in addition, eliminates any leakage paths which would tend to reduce the voltage of the output from the gamma-electric cell.

A third material which may be used for the dielectric material is polystyrene. The styrene is generally received as a styrene monomer and the initial resin preparation involves first mixing the styrene monomer with polystyrene beads. The mixture is then allowed to stand for approximately 2 days in a closed container so that the polystyrene beads are completely dissolved. Hydrogenated terphenyl is then added the mixture. Benzoyl peroxide is then dissolved in a solution of divinyl benzene and acrylonitrile, after which the solution is then added to the resin. The resin is then poured directly into the mold and the mold is then allowed to sit for several days to that any air bubbles trapped are allowed to rise to the surface. The casting is then allowed to gel at room temperature which requires a relatively long length of time, for example, approximately 3 weeks. After gelation, a post-curing is carried out in a 40° C. oven for 2 days. This above procedure produces crack-free bubble-free casting with a minimum of equipment, although the procedure is somewhat time consuming.

It is to be appreciated that the particular methods described above may be varied and that particular ratios of materials may be used in accordance with the desired result. For example, the encapsulation may be carried out in two steps whereupon a portion of the components to be encapsulated is first encapsulated and then a second portion is encapsulated at a later time. The important provision is that the final structure forms an integral member so as not to provide for any leakage paths.

The present invention, therefore, describes the structure and methods of manufacture of gamma-electric cells which produce a high-voltage output, and the buildup of the high voltage may be used for the detection of radiation or the high voltage may be used as an auxiliary source of power so as to capture radiation energy which would otherwise be lost. The invention includes the use of an encapsulation of the inner components so as to eliminate surface charges and leakage paths and provide for intimate contact between the dielectric material and the inner collectors. In addition, the invention provides for the use of multiple collectors which radiate from a central collector so as to increase the area of collection of scattered electrons in the dielectric material.

Although the invention has been described with reference to particular embodiments, it is to be appreciated that various adaptations and modifications may be made, and the invention is only to be limited by the appended claims.

We claim:

1. A method of producing a high output voltage from a source of radiation such as gamma rays, including the steps of:
   providing a dense conducting collector,
   providing a plurality of metal collectors radiating from the dense conducting collector,
   encapsulating the conducting collector and the plurality of metal collectors with a dielectric material and with the dielectric material producing a scattering of electrons in accordance with the reception of the radiation and with the dense conducting collector collecting at least a portion of the scattered electrons, and
   connecting an electrical lead to the collector to provide a high output voltage from the collector.

2. A method of constructing a gamma-electric cell for producing a high output voltage from a source of radiation, including the steps of:
   constructing a principal collector from a dense conducting material,
   providing a plurality of collectors extending from the principal collector, and
   encapsulating the principal collector and the plurality of collectors with a castable, curable dielectric material having a high resistivity when subjected to radiation and a high dielectric constant and with the dielectric material producing a scattering of electrons when subjected to radiation and with the dense conducting material collecting at least a portion of the scattered electrons.

3. A gamma-electric cell for producing a high output voltage from received radiation, including:
   a principal collector composed of a dense conducting material,
   dielectric material surrounding the principal collector and encapsulating the principal collector as a unitary structure and with the dielectric material composed of castable-curable material to provide for the encapsulation,
   a plurality of collector elements distributed within the dielectric material and electrically connected to the principal collector, and
   electrical lead means extending through the dielectric material to contact the principal collector.

4. The gamma-electric cell of claim 3 additionally including a layer of conductor material covering the surface of the dielectric material.

5. The gamma-electric cell of claim 3 wherein the dielectric material is chosen from a group of materials consisting of polystyrene, epoxy and silicone.

6. A gamma-electric cell including:
   a principal conducting collector,
   a plurality of collector elements radiating from and electrically connected to the central conducting collector, and a dielectric material surrounding and encapsulating the principal collector and the plurality of collector elements.

7. The gamma-electric cell of claim 6 wherein at least some of the plurality of collector elements are disposed parallel to one surface of the principal collector.

8. The gamma-electric cell of claim 7 wherein at least some of the plurality of collector elements are disposed perpendicular to one surface of the principal collector.

9. The gamma-electric cell of claim 6 additionally including a conductive layer on the surface of the dielectric material and an electrical lead contacting the principal collector and with a high output voltage produced between the electrical lead and the conductive layer upon the irradiation of the gamma-electric cell.